Figure 1:
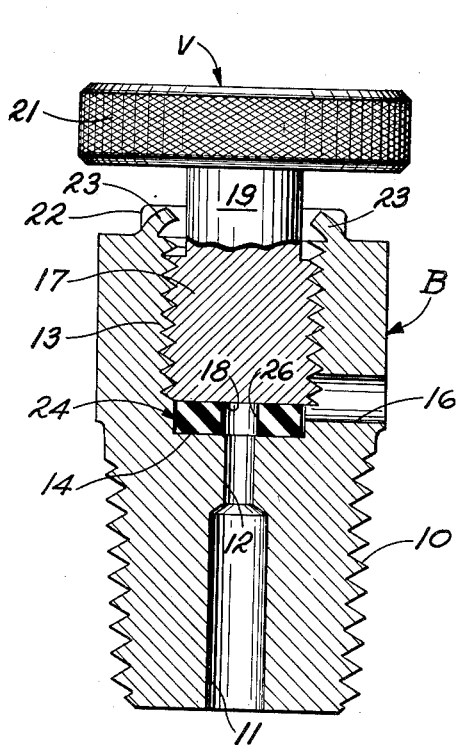

May 4, 1954  A. G. JOHNSON  2,677,526
VALVE WITH FLOATING SEAT
Filed May 20, 1949

INVENTOR.
ANDREW G. JOHNSON
BY Rickey & Watts
ATTORNEYS

UNITED STATES PATENT OFFICE 2,677,526

VALVE WITH FLOATING SEAT

Andrew G. Johnson, Lakewood, Ohio, assignor to The Weatherhead Company, Cleveland, Ohio, a corporation of Ohio Application May 20, 1949, Serial No. 94,383

3 Claims. (Cl. 251—275)

This invention relates to valves or cocks, and, more particularly, to a novel pressure sealing arrangement therefor. Valves of the type to which this invention relates include a sealing member in the form of a disc of material, such as rubber, fiber, or the like, which is pressed by a threaded valve member against the seat to close the valve against fluid pressure.

It is an object of the present invention to reduce the cost of manufacture of such valves and to simplify their assembly. This is accomplished by forming the threaded counterbore in the valve body with a flat, smooth seat surrounding one of the fluid passageways. The other fluid passageway intersects the side wall of the counterbore adjacent the seat. The valve member is threaded and has a flat smooth lower surface, there being an apertured sealing disc preferably of rubber-like material disposed in the bore.

The disc is not attached to either the valve body or the valve member, but is merely inserted in the counterbore before the valve member is threaded therein. Due to the presence of the aperture in the disc when the valve is cracked, fluid communication is established between the passageways regardless of whether the sealing disc adheres to the bottom of the counterbore, to the valve member, or floats therebetween. Thus, no screws, flanging or spinning operations, retaining rings, or the like, are required to assemble the sealing disc in the valve. It is merely inserted therein before the valve member is threaded into the body. The cost of manufacturing and assembly is very small.

The manner whereby these objects and advantages are accomplished will be apparent from the following detailed description of a preferred embodiment of the invention.

Figure 2:
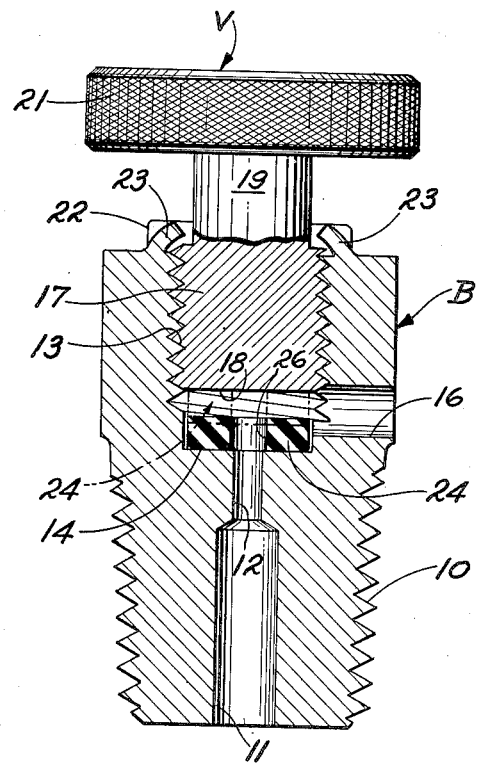

In the drawings:

Fig. 1 is a section through the valve with the valve member in its closed position; and, Fig. 2 shows the valve member in its open position.

The valve includes a body B having a threaded nipple 10 in order to connect the valve to its port although the nature of the mounting means is not a part of this invention. The first fluid passageway extends through the nipple 10 and may take the form of aligning bores 11 and 12. A threaded counterbore 13 is formed in the valve body having a smooth, flat bottom surface 14 that forms one of the sealing seats that is intersected by the passageway 12. The second fluid passageway 16 is shown extending laterally through the valve body and intersects the counterbore 13 adjacent the bottom surface 14.

The valve member V includes the threaded stem 17 having a smooth, flat sealing surface 18 at the lower end thereof, it being understood that the term "lower" is used herein in the interests of simplicity; the valve may be installed in any position. A reduced cylindrical neck 19 extends from threaded stem 17 and may carry means for manual manipulation such as the knurled disc 21. An upper portion of the valve body is flanged as at 22 and the flange may be deformed so as to retain the valve member V in place after it has been threaded into the counterbore. In the preferred form shown, the flange is deformed by indenting it at two or more zones, such as at 23 in the drawings. Sealing disc 24 is, of course, placed in the counterbore before the valve member is threaded therein and retained.

In a preferred form, the sealing disc is of natural or synthetic rubber having a durometer of about 80 to 90, although the invention, in its broader aspects, is not limited to the use of a rubber disk. The disc is apertured as at 26, the aperture being in alignment with the passageway 12 in the body. Because of the aperture 26 and the cooperation of flat surfaces 14 and 18 on the valve member, when the valve is opened it makes no difference whether the disc 24 adheres to the surface 14 of the valve body, to the surface 18 of the valve member, or floats freely therebetween. In any case, fluid communication is established between passageways 12 and 16. In Fig. 2 the sealing disc is shown adhering to the surface 14 of the counterbore, but as shown in dot-dash lines on that figure fluid communication between the passageways would be established if the sealing disc adhered to the surface 18 of the valve member.

This construction has another advantage in addition to economies of assembly and manufacture. This is that due to the random action of the valve disc relative rotation between the disc and the valve parts may occur at either surface, and, accordingly, wear is distributed over both surfaces of the valve member instead of only occurring at one surface thereof. This lengthens the life of the valve assembly.

Another advantage is that the tolerances for the diameter of the counterbore and the valve body, and particularly for the diameter of the rubber member, may be relatively large because there is no critical fitting of the parts about their circumference. This is a particular advantage in actual practice because the valve discs are ordinarily purchased by manufacturers of the metal parts and so they have less control over the tolerances thereof than in cases where the entire assembly is manufactured in one plant.

Having completed a description of a preferred embodiment of the invention, it will be apparent that various modifications thereof may be made without departing from the essence of the invention as defined in the appended claims.

What is claimed is:

1. In a valve, a valve body, a bore in said body having a threaded portion and formed with a smooth, flat bottom surface, a first fluid passageway in said body intersecting the bottom surface of said bore, a second fluid passageway in said body intersecting the side wall of said bore adjacent the bottom surface thereof, a valve member threaded in said body having a smooth flat lower surface, limit means on said valve member and body to limit outward motion of said valve member, said body and valve member forming a chamber bounded on opposed sides by said flat surfaces and circumferentially by the side wall of said bore, and an annular flat sealing disc loosely mounted in said bore between said flat valve and counterbore surfaces, said disc having an aperture in communication with said first fluid passageway, the diameter of said disc being less than the diameter of said bore by an amount less than the difference between the radius of the bore and the radius of the aperture so that the side wall of said bore maintains substantial registry between said disc aperture and first fluid passageway, said parts being arranged so that communication is established between said passageways with said valve member retracted but a slight distance from its closed position, regardless of whether said sealing disc adheres to said valve body or to said valve member, said limit means being disposed so that the maximum spacing of said surfaces is substantially less than the diameter of said disc, the diameter of said second fluid passageway also being substantially less than the diameter of said disc.

2. In a valve, a valve body, a bore in said body having a threaded portion and formed with a smooth, flat bottom surface, an inlet fluid passageway in said body intersecting the bottom surface of said bore, an outlet fluid passageway in said body intersecting the side wall of said bore adjacent the bottom surface thereof, a valve member threaded in said body bore having a smooth flat lower surface, limit means on said valve member and body to limit outward motion of said valve member, said body and valve member forming a chamber bounded on opposed sides by said flat surfaces and circumferentially by the side wall of said bore, and an annular flat sealing disc loosely mounted in said bore between said flat valve and bore surfaces, said disc having an aperture in communication with said inlet fluid passageway, the diameter of said disc being less than the diameter of said bore by an amount less than the difference between the radius of the bore and the radius of the aperture so that the side wall of said bore maintains substantial registry between said disc aperture and inlet fluid passageway, said parts being arranged so that communication is established between said passageways with said valve member retracted but a slight distance from its closed position, regardless of whether said sealing disc adheres to said valve body or to said valve member, said limit means being disposed so that the maximum spacing of said surfaces is substantially less than the diameter of said disc, the diameter of said outlet fluid passageway also being substantially less than the diameter of said disc.

3. A valve comprising a body having a bore therein terminating in a valve seat, said body having a first port communicating with said bore through said valve seat and a second port opening into said bore through the side wall thereof, an annular resilient valve disc having one face engageable with said valve seat but free of attachment thereto, said disc being of substantially greater diameter than the diameters of said ports, and having its peripheral side wall spaced slightly from the side wall of said bore providing an annular fluid passageway therebetween, the relationship between the diameters of the bore, the first port and disc insuring that at least a portion of the disc projects beyond the intersection of said first port and said valve seat entirely around said first port, communicating with said second port, said disc having an aperture extending therethrough and positioned to communicate with said first port, and a valve closure member movable axially in said bore and having a seating face engageable with the other face of said disc but free of attachment thereto, said valve closure member being movable toward said valve seat to press said one face of said disc into sealing engagement with said valve seat to seal said first port from said annular fluid passageway; to press said seating face into sealing engagement with said other face of said disc to seal said aperture from said second port, and means to limit the movement of said seating face of said closure member away from said seat to a distance substantially less than the diameter of said disc.

References Cited in the file of this patent

UNITED STATES PATENTS

| Number | Name | Date |
|---|---|---|
| 10,082 | Wright | Oct. 4, 1853 |
| 213,903 | Hoyt | Apr. 1, 1879 |
| 1,198,537 | Guy | Sept. 19, 1916 |
| 1,442,026 | Grikscheit | Jan. 9, 1923 |
| 2,330,610 | Natter | Sept. 28, 1943 |
| 2,484,102 | Le Valley | Oct. 11, 1949 |